UNITED STATES PATENT OFFICE.

HEINRICH SCHRÖDER, OF HEDWIGSBURG, GERMANY.

PROCESS OF MAKING PHOSPHATES.

991,096.  Specification of Letters Patent.  Patented May 2, 1911.

No Drawing.   Application filed November 13, 1907.  Serial No. 401,903.

*To all whom it may concern:*

Be it known that I, HEINRICH SCHRÖDER, of Hedwigsburg, Germany, a subject of the King of Prussia, and whose post-office address is Bergwerk Hedwigsburg, near Hedwigsburg, in Brunswick, German Empire, have invented a new and useful Process of Making Phosphates; and I do hereby declare that the following is a full, clear, and exact description of my invention, which will enable others skilled in the art to which it appertains to make and use the same.

This invention has for its object an improved process of treating aluminum-iron phosphates and calcium-aluminum-iron phosphates by means of chlorids of alkaline-earth metals in the presence of water whereby I am enabled to transform said phosphates into alkaline-earth phosphates suitable for fertilizing purposes in a simple cheap and otherwise beneficial manner, the aluminum and iron contained in said composite phosphates used as raw materials being recovered in the form of aluminum-sodium chlorid and ferric chlorid.

The distinguishing feature of my improved process consists in this, that a mixture composed of aluminum-iron or calcium-aluminum iron phosphate and an alkaline-earth chlorid is subjected in the presence of water to what is called fractional sublimation, that is to say, the said mixture is heated with the exclusion of air the temperature being progressively raised above 280° centigrade. By thus operating, I am enabled to directly obtain alkaline-earth phosphates from aluminum-iron or calcium-aluminum-iron phosphates as free from alumina and iron oxids as is practically possible and, moreover, to recover the alumina in the form of the double chlorid of aluminum and sodium, which is largely used for the manufacture of metallic aluminum, and I also recover the iron oxids in the form of ferric chlorid, which may be used as such or decomposed in well known manner by means of water or steam into ferric oxid and hydrochloric acid.

Chlorids of alkaline-earth metals most suitable for practicing my present invention are the chlorids of magnesium and calcium owing to their cheapness and efficiency. It is, however, in no way necessary to employ these chlorids in their pure state; their combinations with chlorids of alkaline metals, for instance, raw carnallite, artificial carnallite, and others, as also the refuse salts of the salt industry in general have shown themselves to be satisfactory materials for employment in my improved process, the contained chlorid of the alkaline earth metal being the active agent, and its reaction not being materially impeded by the presence of impurities in the above recited natural compounds and commercial by-products. The water will best be provided for by using a chlorid which contains water and it is preferred to use such chlorid as does not contain more than six equivalents of water or thereabout, that is to say the amount present in crystallized magnesium chlorid or in calcium chlorid. According to the character of the alkaline-earth metal present in the chlorid or chlorids employed, the resulting alkaline-earth phosphate is either directly soluble in citrate of ammonium or must first be subjected in the well-known manner to a treatment with a suitable acid such as hydrochloric acid, to be rendered soluble in said citrate. Thus when chlorid of magnesium is employed, trimagnesic phosphate $(Mg_3P_2O_8)$ is produced which is soluble in citrate of ammonium, whereas, when chlorid of calcium is used, tricalcic phosphate $(Ca_3P_2O_8)$ is formed which, being insoluble in citrate of ammonium, has to be converted by some method such as for instance, treatment with hydrochloric acid, into dicalcic phosphate $(CaHPO_4)$ which is soluble in said citrate, the resulting chlorid of calcium being removed by washing.

In practicing my present invention I prefer to proceed as follows: The phosphate to be acted upon, either aluminum-iron or calcium-aluminum-iron phosphate as the case may be, is ground or otherwise reduced to a state of sufficient fineness to enable it to be intimately mixed with other comminuted solids. The ground phosphate is intimately mixed with such a quantity of magnesium chlorid or calcium chlorid or their said equivalents, that the alkaline-earth chlorid is present in at least the atomic proportion required for the reaction. In consideration of the fact that the composition of the phosphates employed is a very irregular one and that it is practically impossible to prepare such an intimate mixture that each molecule of the phosphate is in contact with a sufficient amount of alkaline-earth chlorid and that thus more or less of the alkaline earth chlorid will be decomposed without acting upon the phosphate, I, in my case, prefer to employ an excess of the alkaline-earth chlorid. This mixture is subjected in a suitable furnace to the action of heat with the exclusion of air after the well-known principle of fractional sublimation, which is carried out as follows: The mixture is slowly heated and the heat raised progressively. As soon as the temperature has surpassed 100° centigrade, (the boiling point of water) and the steam developed becomes superheated, the alkaline-earth chlorid begins to be split up into alkaline-earth oxid and hydrochloric acid and aluminum chlorid is formed. The vapors evolved are led into a highly concentrated cold solution of sodium-chlorid, for instance brine, to produce the double chlorid of aluminum and sodium. This formation of aluminum chlorid continues until a temperature of about 183° centigrade is reached when hydrochloric acid vapors appear which are free from aluminum chlorid. These hydrochloric acid vapors are conducted into a separate condenser. When subsequently the temperature has risen to about 280° centigrade, ferric chlorid begins to be formed and the vapors thereof are conducted into another separate condenser. If the ferric chlorid obtained is to be decomposed into ferric oxid and hydrochloric acid, this may be done by the well-known treatment with steam. I, however, prefer to conduct the vapors into a condenser filled with water to obtain the said decomposition and this condenser may also be used, if desired, for condensing the hydrochloric acid vapors obtained in the preceding phase. When the iron has been driven off the residue consists of, or contains, the alkaline-earth phosphate formed. It may at once be allowed to cool and then be treated in the well-known manner to produce a phosphatic fertilizer or the heating may be continued beyond the period during which vapors of ferric chlorid are formed, and the heat progressively raised up to 720° centigrade or to a lower temperature in order to decompose as much as possible the undecomposed remainder of alkaline-earth chlorid present, the hydrochloric acid vapors produced thereby being collected and condensed and the final residue treated as above stated.

When aluminum iron phosphate is treated according to my present invention with magnesium chlorid the reaction takes place according to the following equation, trimagnesic phosphate $(Mg_3P_2O_8)$ being obtained, which is soluble in citrate of ammonia:

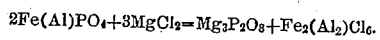

When aluminum iron phosphate is acted upon by calcium chlorid in the manner described, the reaction occurs according to the following equation, tricalcic phosphate $(Ca_3P_2O_8)$ being produced:

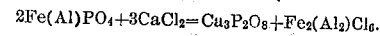

The tricalcic phosphate thus obtained being insoluble in citrate of ammonium, is transformed in the well known manner by means of hydrochloric acid into dicalcic phosphate, $CaHPO_4$, which is soluble in said citrate:

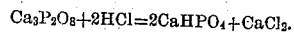

The calcium chlorid formed is removed by washing with water.

When calcium aluminum iron phosphate is employed according to the present process by means of magnesium chlorid, again trimagnesic phosphate $(Mg_3P_2O_8)$, soluble in citric acid, is obtained according to the following equations:

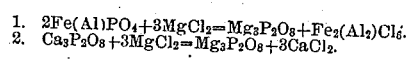

The calcium chlorid formed is removed by washing with water.

When calcium aluminum iron phosphate is treated in the manner specified with calcium chlorid, tricalcic phosphate $(Ca_3P_2O_8)$ is produced from the aluminum and iron components of the composite phosphate and as the calcic component of the latter consists of tricalcic phosphate $(Ca_3P_2O_8)$ the entire phosphate obtained is in the form of tricalcic phosphate $(Ca_3P_2O_8)$:

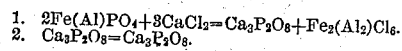

The tricalcic phosphate obtained is rendered soluble in citrate of ammonium in the manner aforesaid and the chlorid of calcium thereby produced is extracted by washing with water.

For the purpose of properly claiming my invention I will use the name aluminum-iron phosphate as a generic term including both the simple aluminum-iron phosphate and the compound, calcium-aluminum-iron phosphate, which contains aluminum-iron phosphate.

It will be understood by those skilled in the art that the above equations are abbreviated equations, that is to say, equations in which for sake of simplicity the intermediate reaction of splitting up the chlorid into oxid and hydrochloric acid by the water present has been omitted.

Having, therefore, described my invention, I claim:—

1. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum sodium; third, continuing the heating to 183 degrees centigrade and above until hydrochloric acid vapor is given off; fourth, condensing said hydrochloric acid in a separate chamber.

2. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber.

3. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber containing water for purposes of condensation.

4. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber; seventh, continuing the heating to a temperature between 280 and 720 degrees centigrade to complete the decomposition of all the alkaline earth chlorid.

5. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber; seventh, continuing the heating to a temperature between 280 and 720 degrees centigrade to complete the decomposition of all the alkaline earth chlorid, condensing the hydrochloric acid so given off in a separate chamber.

6. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber; seventh, treating the residue with hydrochloric acid.

7. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber; seventh, continuing the heating to a temperature between 280 and 720 degrees centigrade to complete the decomposition of all the alkaline earth chlorid; eighth, treating the residue with hydrochloric acid.

8. The herein described process of making phosphates which comprises the following steps: first, heating to above 100 degrees centigrade in the absence of air and presence of water, an aluminum iron phosphate mixed with a quantity of alkaline earth chlorid in excess of the atomic proportions, until chlorid of aluminum is given off; second, condensing in a separate chamber the vapor of such chlorid of aluminum in a solution of sodium chlorid to form the double chlorid of aluminum and sodium; third, continuing the heating to 183 degrees centigrade and above until hydrochloric acid vapor is given off; fourth, condensing said hydrochloric acid in a separate chamber; fifth, continuing the heating to 280 degrees centigrade and above until chlorid of iron is given off; sixth, conducting the chlorid of iron into a separate chamber; seventh, treating the residue with hydrochloric acid; eighth, washing out with water the calcium chlorid so formed.

In testimony whereof I have hereunto set my hand in presence of two subscribing witnesses.

HEINRICH SCHRÖDER.

Witnesses:
 Dr. ZEHRING,
 E. THIELE.